July 1, 1930.  F. A. ANETSBERGER ET AL  1,769,048
BREAD RAISING CABINET
Filed Feb. 10, 1927  2 Sheets-Sheet 1

Witness:
Chas. R. Koursh

Inventors
Frank A. Anetsberger
William Anetsberger

July 1, 1930. F. A. ANETSBERGER ET AL 1,769,048
BREAD RAISING CABINET
Filed Feb. 10, 1927  2 Sheets-Sheet 2
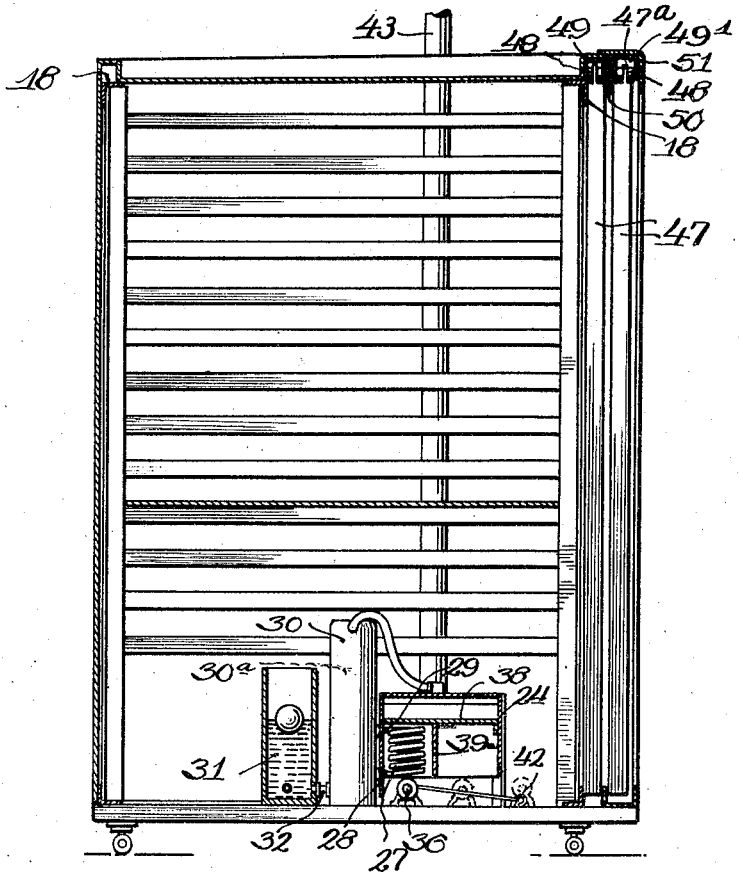
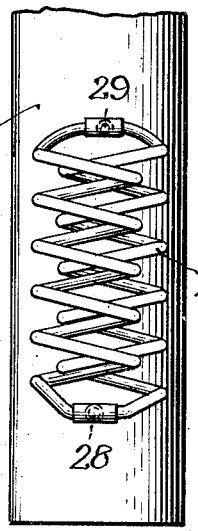
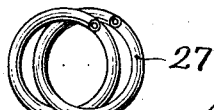
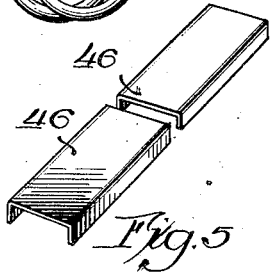
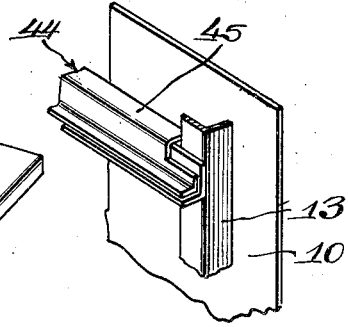
Inventors,
Frank A. Anetsberger
and William Anetsberger Patented July 1, 1930

1,769,048

UNITED STATES PATENT OFFICE

FRANK A. ANETSBERGER AND WILLIAM ANETSBERGER, OF CHICAGO, ILLINOIS

BREAD-RAISING CABINET

Application filed February 10, 1927. Serial No. 167,236.

This invention relates to improvements in bread raising cabinets, such as are employed by bakers for holding the bread or bun dough during the raising of the same, and sometimes called proofing boxes.

The principal object of the invention is to provide an improved cabinet of the type referred to which is provided with ventilating or air circulation passages by means of which a uniform distribution of heat and moisture within the cabinet is possible.

Another object relates to the provision of shields or deflectors which may be used when desired to deflect the air currents from the vertical passages into the horizontal passages between the bread pans, thus insuring still greater uniformity in heat distribution and ventilator, than in cabinets as heretofore constructed.

A further object relates to improvements in the cabinet heating means whereby a compact arrangement is provided and which can be adjusted to vary the heat and humidity within the cabinet.

Another object of the invention relates to the arrangement of bread pan supporting shelves and co-operating framework whereby the various members are supported independently of the side walls of the cabinet, and can thus be constructed with less handwork and more economically than can cabinets of the type generally in use.

Additional objects relate to various features of construction and arrangement of parts which will become apparent from a consideration of the following specification and accompanying drawings, wherein Figure 1 is a vertical sectional view taken on line 1—1, Fig. 2.

Fig. 3 is a vertical sectional view taken on line 3—3, Fig. 2.

Fig. 4 is a broken detailed view illustrating a side shield or baffle.

Fig. 5 is a perspective view of a center baffle.

Fig. 6 is an enlarged front elevation of a heating coil and vertical tank communicating therewith.

Fig. 7 is a broken plan view illustrating the meshing arrangement of the heating coils.

Figure 2:
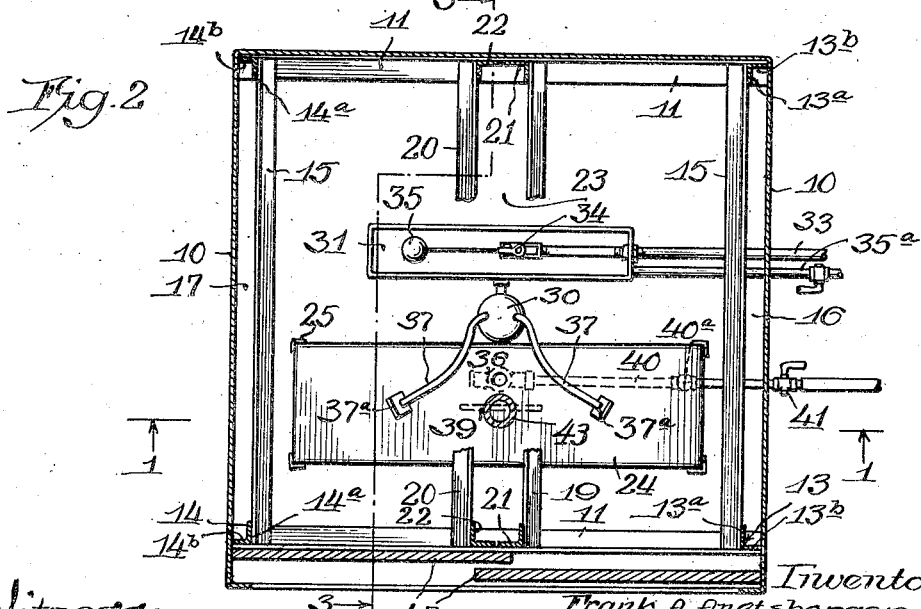
Fig. 2 is a horizontal section on line 2—2, Fig. 1, parts of the structure being broken away for the purpose of clearness.

The cabinet preferably has a sheet metal exterior 10 built around a framework of metal members, preferably of angle or L-form. The framework consists of front and rear angle base members 11, the vertical flanges of which have the adjacent sheet metal covering 10 riveted or otherwise secured thereto. Extending upwardly from the base members 11 are the two pairs of corner posts 13, 13 and 14, 14, each pair having two flanges $13^a$, $13^a$ and $14^a$, $14^a$, respectively. The flanges of each pair are disposed in the same plane, and spaced from the adjacent walls 10 by the other flanges $13^b$, $13^b$ and $14^b$, $14^b$ of the said members, as shown in Fig. 2.

The pan supporting members or shelves 15 are secured as by rivets to the posts 13 and 14, and are thus spaced from the adjacent side walls of the cabinet to provide ventilating passages 16 and 17. Upper angle members 18 at front and rear connect the upper ends of the posts 13 and 14, and are arranged with respect to the walls of the cabinet, similarly to the base members 11. The cabinet preferably, although not necessarily, is arranged for two tiers of bread pans, and thus shelves 19 and 20, complementary to the side shelves 15, 15, are provided in the center of the cabinet. The shelves 19 are secured to the vertical members 21, 21, and shelves 20 to the vertical members 22, 22, which are attached to the base and top portions of the frame. The uprights 21, 21 constitute a pair and are spaced, as shown in Fig. 2, from the pair consisting of members 22, 22, and thus provide a vertical ventilating or air circulation passage 23 in the center of the cabinet.

As will be seen, the framework of the cabinet consists of standard L or angle members, the rivet holes in which can be made by a punch press. In the prior construction where the relatively large metal sheets of the cabinet have the shelves riveted to them, a considerable amount of hand drilling is necessary, and no ventilating passages are provided between the side walls of the cabinet and the ends of the pans carried on the shelves. As will be obvious, the present improved cabinet lends to machine production, in large measure, and a very sturdy cabinet of low cost production has been provided.

A heater for controlling the temperature within the cabinet is also provided, which heater may consist of a rectangular sheet metal enclosure 24, which is open at the bottom and is supported by legs 25 a short distance above the floor 26 of the cabinet. A heating coil 27 is positioned within the heater 24 and consists of right and left turn coils united at their upper and lower ends to horizontal pipes 28 and 29, which extend from the side of a vertical pipe or auxiliary tank 30 which is positioned outside the heater 24. This arrangement permits the water to circulate through the coils 27 and auxiliary tank 30 and to thus heat the relatively small quantity of water therein without heating the water of the main tank 31. The coil 27, as stated, consists of right and left hand coils, which are arranged to mesh substantially as shown in Fig. 7, whereby an unusually large heating surface is provided in the relatively small space available. A water supply tank 31 is connected by a short pipe to the auxiliary tank 30. The main tank 31 is supplied with water through a suitable pipe 33, from any source of supply. Within the tank 31, an automatic shut-off valve 34 of standard construction is provided which is operated by means of a float 35. Water flowing through the pipe 33 is shut off when the level of the water within the tank has risen to a proper height. A drain pipe $35^a$ may be provided whereby the water from the tank can be drained out when desired.

Figure 1:
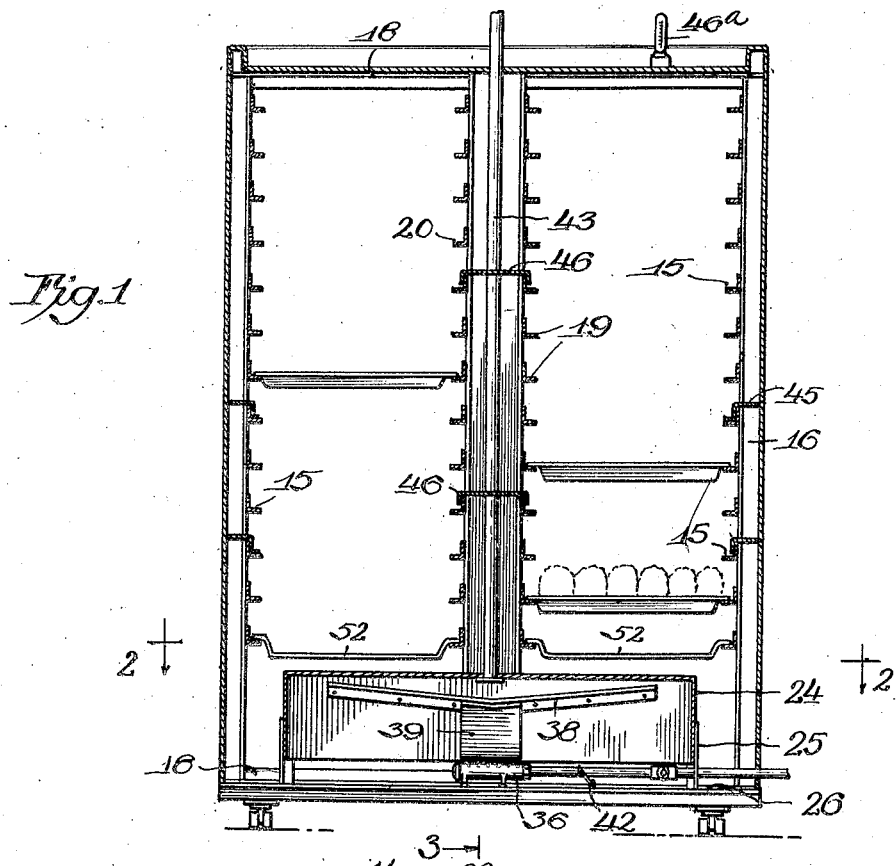

A burner 36 is also provided which, in normal operative position, rests on the floor of the cabinet under coil 27, whereby the latter is heated and steam generated which passes from the coil 27 into the auxiliary tank 30 and out at the top of said tank into the distributing pipes 37, at the ends of which may be provided upwardly extending deflectors $37^a$, which rest upon the top of the heater 24. The auxiliary tank 30 extends somewhat above the water level in tank 31, thus providing a chamber $30^a$ in the upper end of tank 30. By providing this chamber $30^a$, the steam is permitted to escape through pipes 37 without ejecting water, as will be clear. The members $37^a$ deflect the steam or vapor upwardly and effect a more uniform distribution of the same with reference to the central passages 23 and side passages 16 and 17 than would be the case if the steam were discharged freely from the pipes 37. Beneath the top of heater 24 is provided a heat spreader or deflector 38 which, as shown in Fig. 1, slopes downwardly toward the center. To the right of the coil, as viewed in Fig. 3, a shield 39 is provided and which may be attached to the spreader 38, or otherwise supported.

The flexible union $40^a$ permits the burner to be swung toward the front of the cabinet to a position at the right of the shield 39, as viewed in Fig. 3, or to a position outside of the heater 24, as shown in dotted lines in the same figure. A suitable handle 42 is provided whereby the burner can be moved manually, as above mentioned. When the humidity of the air within the cabinet is at the desired maximum, the burner is moved by means of the handle 42 to the right of the shield 39, as viewed in Fig. 3, whereby the burner continues to heat the cabinet, and does not generate any additional steam. The products of combustion are conducted toward the ends of the heater 24 by means of the spreader 38, thence over the same and upwardly out of the cabinet through the exhaust pipe 43.

In use, the pans of bread are inserted in the cabinet upon the shelves 15, 19 and 15, 20, and the burner is pulled to the exterior or righthand position, as viewed in Fig. 3, lighted and returned to its position under the coils 27. The heat tends to rise through the passages 16, 17 and 23, but to increase circulation horizontally of the cabinet between the pans, baffles 44 are provided. As shown in Fig. 4, the side baffles may consist of suitably shaped pieces of sheet metal each adapted to rest upon one of the shelves 15 and having a horizontally extending flange 45 for closing the side passages 16 or 17. The upwardly rising column of air is thus deflected horizontally under the pans toward the central passage 23. These side deflectors 44 may be spaced as desired along each side of the cabinet and center baffles or deflectors 46, shown in perspective in Fig. 5, may be arranged in staggered relation with reference to the side baffles to deflect the heated air back toward the side passages. The center baffles 46 may be formed in two sections, one being disposed on each side of exhaust pipe 43.

It will be obvious that by means of the passages provided and by using the deflectors or baffles just described, the heated air may be caused to travel circuitous paths in rising from the base of the cabinet to the top thereof. A thermometer $46^a$ may be provided, if desired, and other registering instruments, such as a hygrometer may also be used when desired.

The cabinet is provided with a pair of sliding doors 47, each having rollers 48 secured to a central top extension $47^a$, which rollers travel within the channel members 49, 49' at the top of the cabinet. The sheet metal top is shaped to enclose the channel member 49 on three sides and extends downwardly a distance below the members 49, 49' to form a seal 50 between the upper edges of the doors. An outer corner reinforcing angle iron 51 encloses member 49', as shown, and overlies a portion of the upper surface of member 49, thus providing a very tight construction. By suspending the rollers as described, instead of having them at the bottom of the doors, as in many of the cabinets as heretofore constructed, the rollers are maintained free from foreign substances which tend to prevent the free operation thereof.

Immediately above the heater 24 on the lower shelves preferably, we provide deflecting shields 52 which may consist of a piece of sheet metal shaped as in Fig. 1, or an empty bread pan may be used in lieu thereof. We find it preferable, as a rule, not to place bread on the shelves immediately above the heater because of the excess of heat at those points.

Although we have shown various features of construction and arrangement of parts, it will be understood that such are for the purpose of illustration only, and we do not wish to be restricted to the specific embodiment of the invention herein shown and described, except where limitations thereto appear in the appended claim.

We claim:

Humidifying and heating apparatus comprising a casing having side, end and top walls and being open at the bottom, legs supporting said casing to admit air into said open bottom, a distributor plate secured to opposite side walls of the casing and spaced from the top wall thereof, said plate being inclined upwardly from the center and terminating short of the end walls of the casing, a shield depending from the approximate center of said plate, a water coil positioned between said shield and one side wall of the casing, means for supplying water to said coil, said coil having an outlet for the free escape of vapor generated therein, and a manually movable burner slidable laterally of said casing in the space beneath the same afforded by said legs whereby heat can be directed to either side of said shield, said casing having an outlet in the top wall for the escape of heated air and products of combustion after the same have been caused to flow around said deflector to heat said casing.

In testimony whereof, we have subscribed our names.

FRANK A. ANETSBERGER.
WILLIAM ANETSBERGER.